United States Patent
Lee et al.

(10) Patent No.: US 7,766,599 B2
(45) Date of Patent: Aug. 3, 2010

(54) PLASMA LIFTED BOUNDARY LAYER GAS TURBINE ENGINE VANE

(75) Inventors: Ching-Pang Lee, Cincinnati, OH (US); Aspi Rustom Wadia, Loveland, OH (US); David Glenn Cherry, Loveland, OH (US); Je-Chin Han, College Station, TX (US)

(73) Assignee: General Electric Company, Schenectady, NY (US)

( * ) Notice: Subject to any disclaimer, the term of this patent is extended or adjusted under 35 U.S.C. 154(b) by 758 days.

(21) Appl. No.: 11/591,264

(22) Filed: Oct. 31, 2006

(65) Prior Publication Data

US 2008/0101913 A1 May 1, 2008

(51) Int. Cl.
*F01B 25/02* (2006.01)
(52) U.S. Cl. .............................. 415/1; 415/10; 415/914
(58) Field of Classification Search ............... 415/1, 415/10, 115, 116, 914; 416/95, 96 A, 96 R, 416/97 R
See application file for complete search history.

(56) References Cited

U.S. PATENT DOCUMENTS

| | | | | |
|---|---|---|---|---|
| 4,504,189 | A * | 3/1985 | Lings | 415/115 |
| 5,320,309 | A * | 6/1994 | Nosenchuck et al. | 244/205 |
| 6,394,750 | B1 * | 5/2002 | Hiskes | 415/189 |
| 6,561,760 | B2 * | 5/2003 | Wadia et al. | 415/145 |
| 6,570,333 | B1 * | 5/2003 | Miller et al. | 315/111.21 |
| 6,619,030 | B1 | 9/2003 | Seda et al. | |
| 6,708,482 | B2 | 3/2004 | Seda | |
| 6,732,502 | B2 | 5/2004 | Seda et al. | |
| 6,805,325 | B1 * | 10/2004 | Malmuth et al. | 244/205 |
| 2006/0005545 | A1 | 1/2006 | Samimy et al. | |

FOREIGN PATENT DOCUMENTS

| | | |
|---|---|---|
| EP | 1906136 A1 | 9/2008 |
| WO | WO2005/114013 A1 | 12/2005 |

OTHER PUBLICATIONS

European Search Report and Opinion, Application No. EP07254056, Mar. 12, 2009, 10 pages.

AIAA 2007-647, Stereo PIV of a Turbine Tip Clearance Flow with Plasma Actuation, Daniel K. Van Ness II, Thomas C. Corke, and Scott C. Morris, 22 pages.

(Continued)

*Primary Examiner*—Edward Look
*Assistant Examiner*—Sean J Younger
(74) *Attorney, Agent, or Firm*—William Scott Andes; Steven J. Rosen

(57) ABSTRACT

A plasma boundary layer lifting system includes at least one gas turbine engine vane having a spanwise extending airfoil with an outer surface extending in a chordwise direction between opposite leading and trailing edges and chordwise spaced apart plasma generators for producing a plasma extending in the chordwise direction along the outer surface. Each plasma generator may include inner and outer electrodes separated by a dielectric material disposed within a spanwise extending groove in the outer surface. The airfoil may be hollow having an outer wall and the plasma generators being mounted on the outer wall. A method for operating the system includes forming a plasma extending in the chordwise direction along the outer surface of the airfoil. The method may further include operating the plasma generators in steady state or unsteady modes.

26 Claims, 5 Drawing Sheets

OTHER PUBLICATIONS

AIAA 2006-20, "Turbine Blade Tip Leakage Flow Control by Partial Squealer Tip and Plasma Actuators", Travis Douville, Julia Stephens, Thomas Corke, and Scott Morris, 18 pages.

AIAA 2005-782, "Tip Clearance Control Using Plasma Actuators", Scott C. Morris, Thomas C. corke, Daniel Van Ness, Julia Stephens, and Travis Douville, 8 pages.

XP007907306, "Active Flow Control in Turbomachinery Using Phased Plasma Actuators", B. Goksel and I. Rechenberg, 2 pages.

XP009112404, "Turbine Tip Clearance Flow Control using Plasma Actuators", Daniel K. Van Ness II, Thomas Co. Corke, and Scott C. Morris, 12 pages.

Science Direct, "SDBD plasma enhanced aerodynamics: concepts optimization and applications", Thomas C. Corke, Martiqua L. Post, and Dmitry M. Orlov, 26 pages.

XP007907356, "Plasma (physics)", From Wikipedia, 16 pages.

XP007907353, "Dielectric barrier discharge", From Wikipedia, 2 pages.

"Overview of Plasma Flow Control: Concepts, Optimization, and Applications", Thomas C. Corke and Martiqua L. Post, 43rd AIAA Aerospace Sciences Meeting and Exhibit, Jan. 10-13, 2005, Reno, Nevada, AIAA 2005-563, 15 pages.

"Plasma Control of Boundary Layer Using Low-Temperature Non-Equilibrium Plasma of Gas Discharge", D.F. Opaits, D.V. Roupassov, S.M. Starikovskaia, A.Yu. Starikovskii, I.N. Zavialov, and S.G. Saddoughi, 43rd AIAA Aerospace Sciences Meeting and Exhibit, Jan. 10-13, 2005, Reno, Nevada, AIAA 2005-1180, 6 pages.

"Demonstration of Separation Delay With Glow-Discharge Plasma Actuators", Lennart S. Hultgren and David E. Ashpis, 41st AIAA Aerospace Sciences Meeting and Exhibit, Jan. 6-9, 2003, Reno, Nevada, AIAA 2003-1025, 10 pages.

"Unsteady Plasma Actuators for Separation Control of Low-Pressure Turbine Blades", Junhui Huang, Thomas C. Corke and Flint O. Thomas, AIAA Journal, vol. 44, No. 7, Jul. 2006, pp. 1477-1487.

"Control of Separation in Turbine Boundary Layers", R.B. Rivir, R. Sondergaard, J.P. Bons, and N. Yurchenko, 2nd AIAA Flow Control Conference, Jun. 28-Jul. 1, 2004, Portland, Oregon, 16 pages.

"Plasma Flow Control Optimized Airfoil", Thomas C. Corke, Benjamin Mertz, and Mehul P. Patel, 44th AIAA Aerospace Sciences Meeting and Exhibit, Jan. 9-12, 2006, Reno, Nevada, AIAA 2006-1208, 13 pages.

"Control of Transitional and Turbulent Flows Using Plasma-Based Actuators", Miguel R. Visbal, Datta V. Gaitonde, and Subrata Roy, 36th AIAA Fluid Dynamics Conference and Exhibit, Jun. 5-8, 2006, San Francisco, California, AIAA 2006-3230, 22 pages.

"AC and Pulsed Plasma Flow Control", R. Rivir, A. White, C. Carter, B. Ganguly, J. Jacob, A. Forelines, and J. Crafton, 42nd AIAA Aerospace Sciences Meeting and Exhibit, Jan. 5-8, 2004, Reno, Nevada, AIAA 2004-847, 9 pages.

"Effects of Plasma Induced Velocity on Boundary Layer Flow", Brian E. Balcer, Milton E. Franke, and Richard B. Rivir, 44th AIAA Aerospace Sciences Meeting and Exhibit, Jan. 9-12, 2006, Reno, Nevada, AIAA 2006-875, 12 pages.

"Flow Control Using Plasma Actuators and Linear / Annular Plasma Synthetic Jet Actuators", Arvind Santhanakrishan, Jamey D. Jacob, and Yildirim B. Suzen, 3rd AIAA Flow Control Conference, Jun. 5-8, 2006, San Francisco, California, AIAA 2006-3033, 31 pages.

"Turbulent Drag Reduction by Surface Plasma through Spanwise Flow Oscillation", Timothy N. Jukes, Kwing-So Choi, Graham A. Johnson, and Simon J. Scott, 3rd AIAA Flow Control Conference, Jun. 5-8, 2006, San Francisco, California, AIAA 2006-3693, 14 pages.

\* cited by examiner

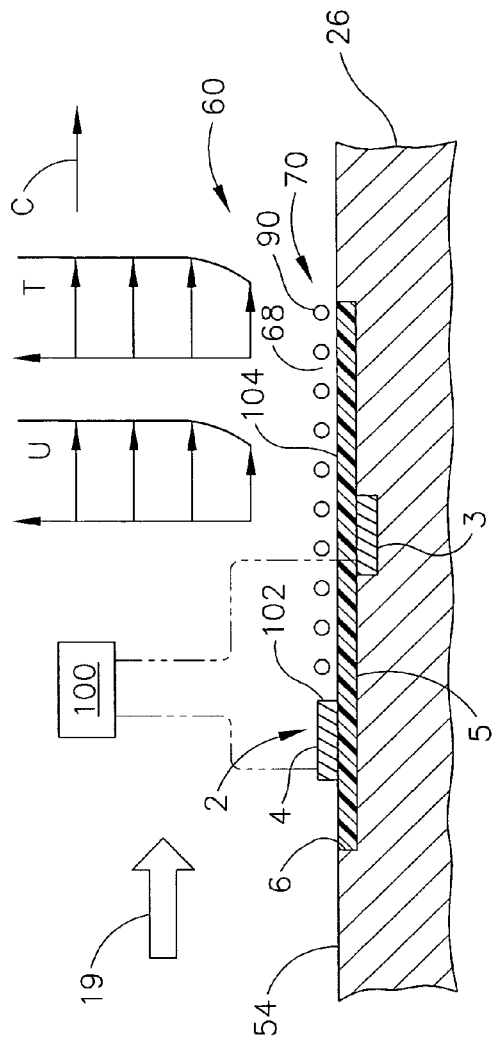
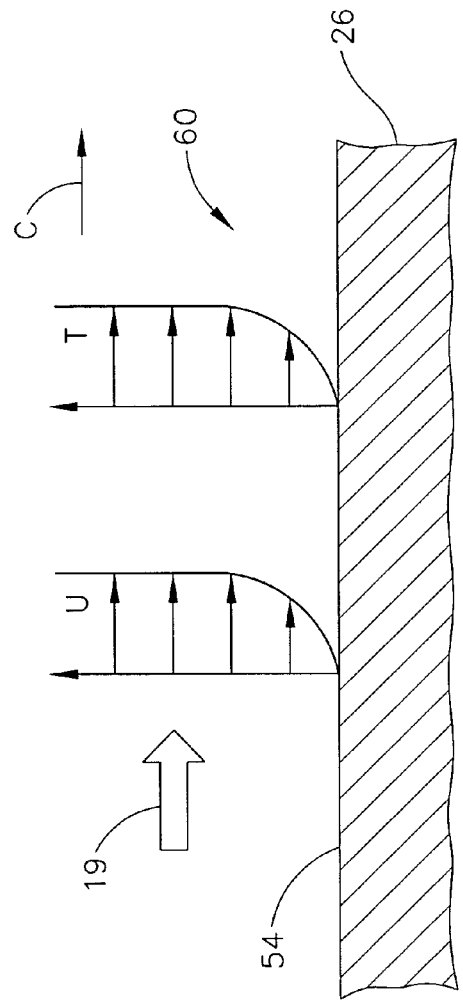
FIG. 5
FIG. 6

PLASMA LIFTED BOUNDARY LAYER GAS TURBINE ENGINE VANE

BACKGROUND OF THE INVENTION

1. Field of the Invention

The invention relates to aircraft gas turbine engines and, particularly, to turbine vane airfoils of gas turbine engines.

2. Description of Related Art

A typical gas turbine engine of the turbofan type generally includes a forward fan and a booster or low pressure compressor, a middle core engine, and a low pressure turbine which powers the fan and booster or low pressure compressor. The core engine includes a high pressure compressor, a combustor and a high pressure turbine in a serial flow relationship. The high pressure compressor and high pressure turbine of the core engine are connected by a high pressure shaft. High pressure air from the high pressure compressor is mixed with fuel in the combustor and ignited to form a high energy gas stream. The gas stream flows through the high pressure turbine, rotatably driving it and the high pressure shaft which, in turn, rotatably drives the high pressure compressor.

The gas stream leaving the high pressure turbine is expanded through a second or low pressure turbine. The low pressure turbine rotatably drives the fan and booster compressor via a low pressure shaft. The low pressure shaft extends through the high pressure rotor. Most of the thrust produced is generated by the fan. Marine or industrial gas turbine engines have low pressure turbines which power generators, ship propellers, pumps and other devices while turboprops engines use low pressure turbines to power propellers usually through a gearbox.

The high pressure turbine has a turbine nozzle including at least one row of circumferentially spaced apart airfoils or vanes radially extending between radially inner and outer bands. The vanes are usually hollow having an outer wall that is cooled with cooling air from the compressor. Hot gases flowing over the cooled turbine vane outer wall produces flow and thermal boundary layers along outer surfaces of the vane outer wall and end wall surfaces of the inner and outer bands over which the hot gases pass.

There are velocity gradients within the gas flow boundary layer and gas temperature gradients within the thermal boundary layer adjacent to the outer surface of the vane outer wall. The velocity gradient results in shear stresses in the gas flow and forms undesirable aerodynamic drag. The gas temperature gradient results in undesirable heat transfer from the hot gas to the colder outer surface producing unwanted surface heating. It is desirable to reduce the velocity gradients within the gas flow boundary layer to reduce the surface drag and improve the aerodynamic efficiency. It is also desirable to reduce the temperature gradients within the gas thermal boundary layer to reduce the heat transfer for better component life or lower cooling flow requirement for better engine efficiency.

SUMMARY OF THE INVENTION

A plasma boundary layer lifting system includes at least one gas turbine engine vane having a spanwise extending airfoil with an outer surface extending in a chordwise direction between opposite leading and trailing edges. Chordwise spaced apart plasma generators are used for producing a plasma extending in the chordwise direction along the outer surface. In the exemplary embodiment of the system, the plasma generators are mounted on the airfoil. Each of the plasma generators include inner and outer electrodes separated by a dielectric material. The dielectric material is disposed within a spanwise extending groove in an outer surface of the airfoil. An AC power supply is connected to the electrodes to supply a high voltage AC potential to the electrodes.

In a more particular embodiment of the system, the airfoil is hollow and the plasma generators are mounted on the outer wall of the airfoil and the dielectric material is disposed within a spanwise extending groove in an outer surface of the outer wall. The system is illustrated for use with a high pressure turbine nozzle but may be used with other vane assemblies in the engine.

A method for operating a gas turbine engine having a plasma boundary layer lifting system includes forming a plasma extending in the chordwise direction along outer surface of an airfoil of one or more gas turbine engine vanes in a row of circumferentially spaced apart and radially extending gas turbine engine vanes. In a more particular embodiment of the method, forming the plasma further includes energizing chordwise spaced apart and spanwise extending plasma generators. The plasma generators may be operated in steady state or unsteady modes.

BRIEF DESCRIPTION OF THE DRAWINGS

The foregoing aspects and other features of the invention are explained in the following description, taken in connection with the accompanying drawings where:

FIG. 5 is a schematical and partial graphical illustration with the plasma generators illustrated in FIG. 4 energized and a boundary layer.

FIG. 6 is a graphical illustration of a boundary layer without the plasma generators illustrated in FIG. 4 energized.

DETAILED DESCRIPTION OF THE INVENTION

Figure 1:
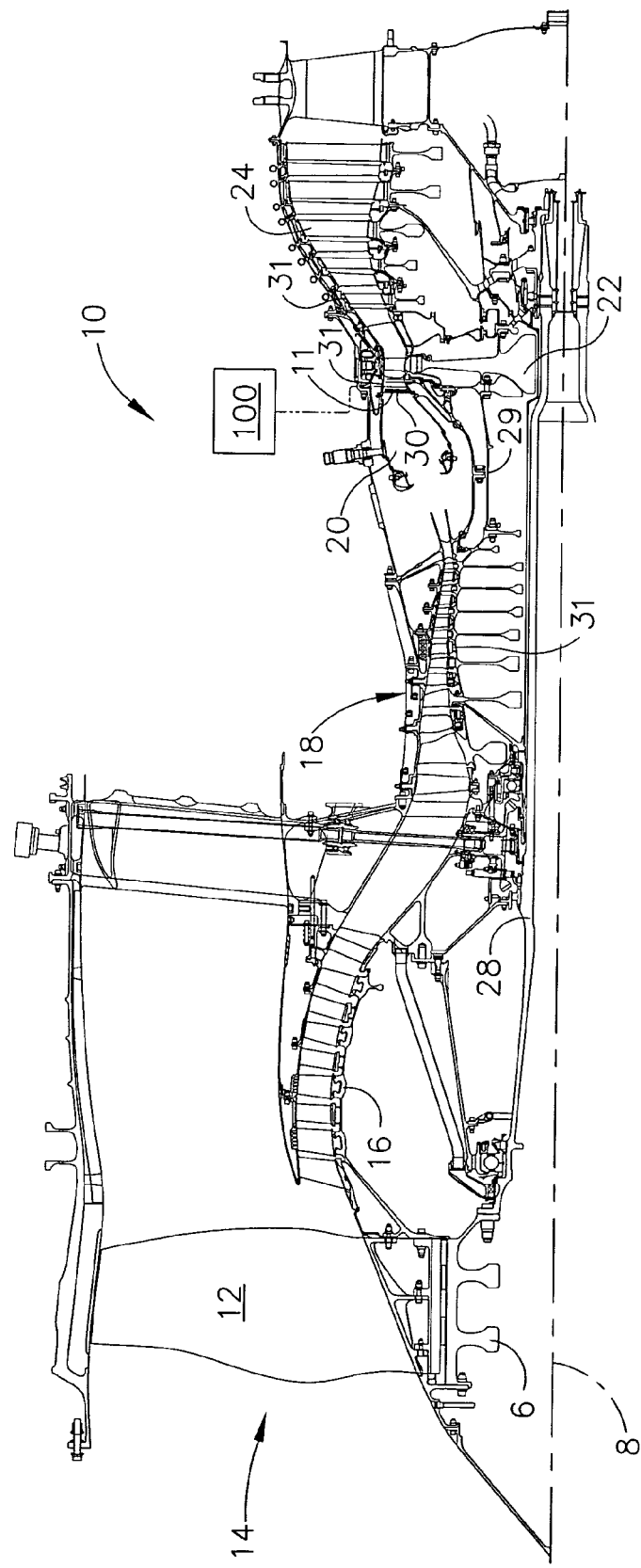
FIG. 1 is a longitudinal, sectional view illustration of exemplary embodiment of an aircraft gas turbine engine with a plasma boundary layer lifting system for nozzle vanes of a high pressure turbine section of the engine.

Illustrated in FIG. 1 is an exemplary turbofan gas turbine engine 10 circumscribed about an engine centerline axis 8 and having a fan 12 which receives ambient air 14, a booster or low pressure compressor (LPC) 16, a high pressure compressor (HPC) 18, a combustor 20 which mixes fuel with the air 14 pressurized by the HPC 18 for generating combustion gases or gas flow 19 which flows downstream through a high pressure turbine (HPT) 22, and a low pressure turbine (LPT) 24 from which the combustion gases are discharged from the engine 10. The HPT 22 is joined to the HPC 18 to substantially form a high pressure rotor 29. A low pressure shaft 28 joins the LPT 24 to both the fan 12 and the low pressure compressor 16. The second or low pressure shaft 28 which is at least in part rotatably disposed co-axially with and radially inwardly of the first or high pressure rotor.

Figure 2:
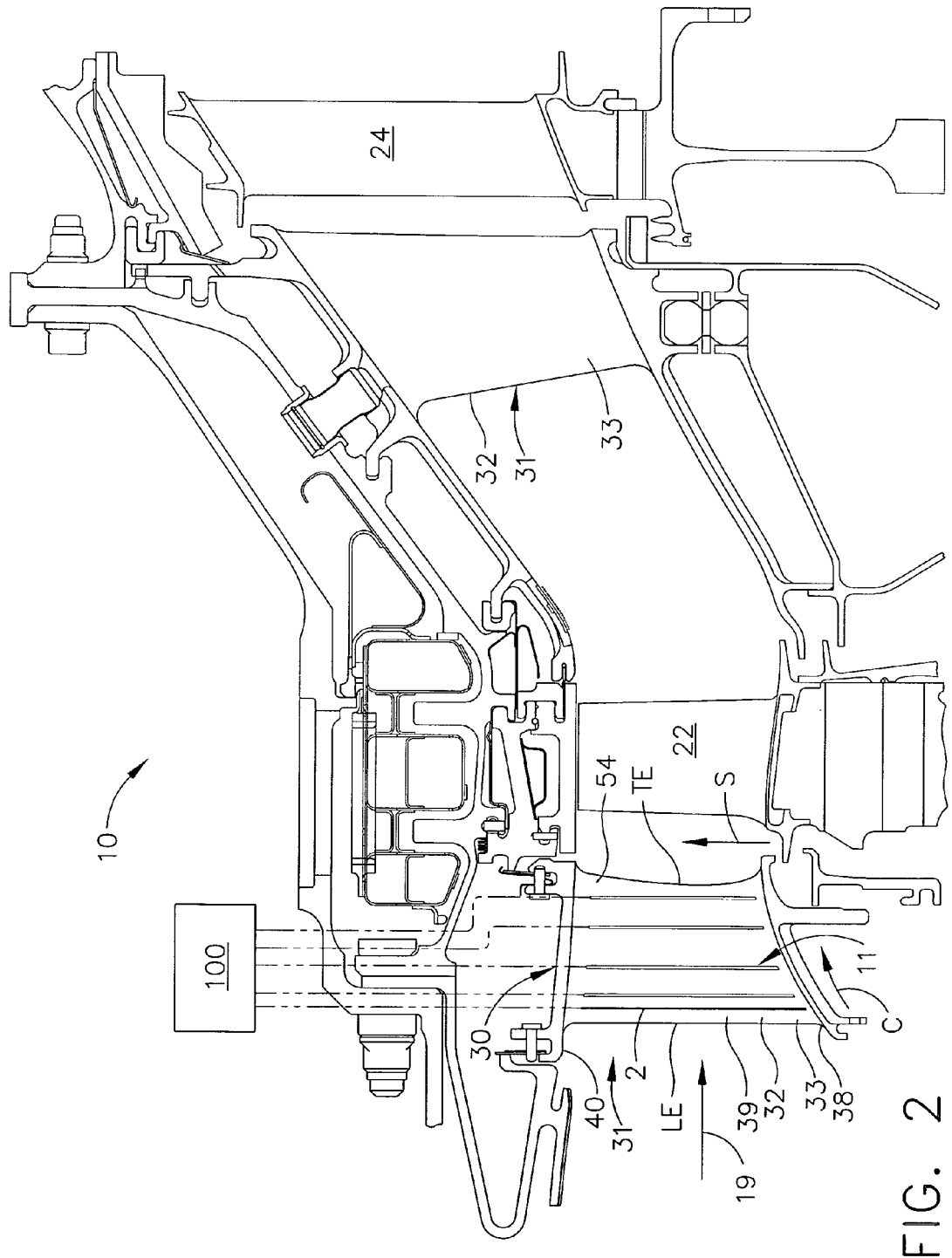
FIG. 2 is an enlarged view of the nozzle vanes and the plasma boundary layer lifting system illustrated in FIG. 1.
Figure 3:
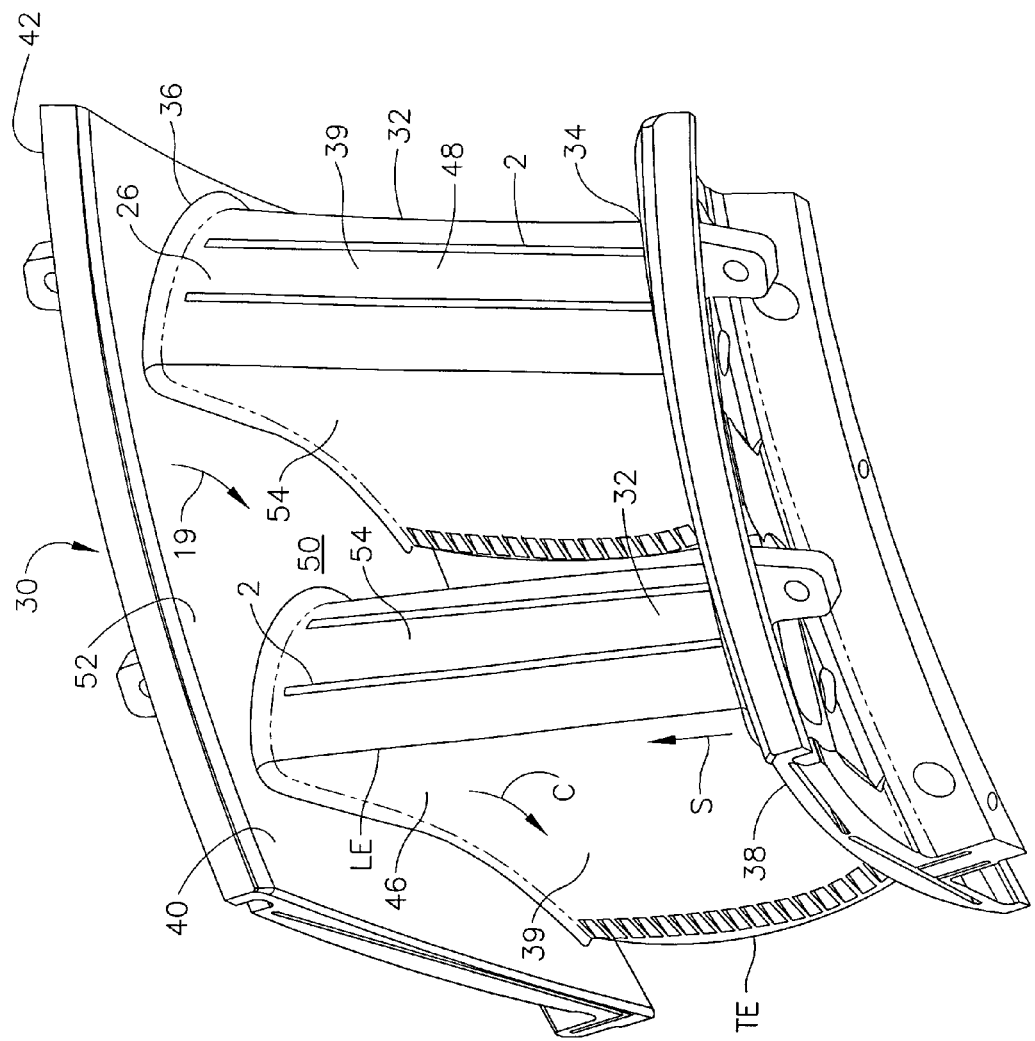
FIG. 3 is an enlarged perspective view of the vanes and plasma generators illustrated in FIG. 2.

Illustrated in FIGS. 2 and 3 is a turbine nozzle 30 of the high pressure turbine 22 through which the hot gas flow 19 is discharged into from the combustor 20. The exemplary embodiment of the turbine nozzle 30, which is also more generally referred to as a vane assembly 31, illustrated in FIGS. 2 and 3 includes a row 33 of circumferentially spaced apart and radially extending vanes 32 having hollow airfoils 39 integrally joined at radially inner and outer ends 34, 36 to radially inner and outer bands 38, 40, respectively. In the exemplary embodiment of the turbine nozzle 30 illustrated herein, the bands and vanes are formed in circumferential segments 42 typically, with two vanes 32 per segment 42. There may be more than two segments and the segments typically have axial split lines suitably joined together by conventional spline seals therebetween. A portion of pressurized cooling air is bled from the compressor for providing cooling air to the turbine nozzle 30 for cooling the various components thereof including the hollow airfoils 39 and inner and outer bands.

Figure 4:
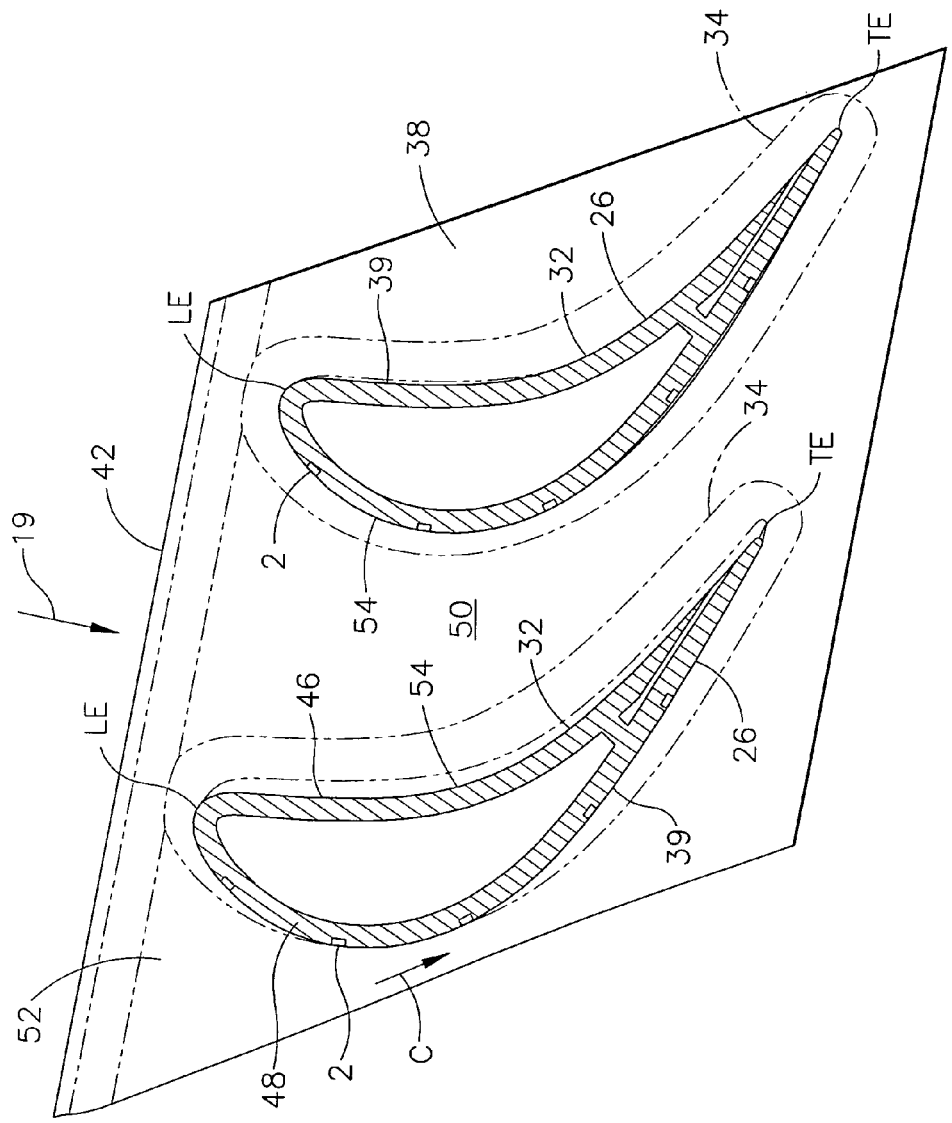
FIG. 4 is a perspective illustration through the vanes illustrated in FIG. 3.

Referring to FIGS. 3 and 4, each airfoil 39 includes an outer wall 26 having a pressure side 46 and a circumferentially opposite suction side 48 which extend axially in a chordwise direction C between opposite leading and trailing edges LE, TE respectively. The airfoils 39 and the outer walls 26 extend radially in a spanwise direction S between the inner and outer bands 38, 40. The bands are typically integrally cast with the corresponding vanes during initial manufacture thereof. The hot combustion gas flow 19 pass through flow passages 50 between the airfoils 39. The flow passages 50 are bound by inboard surfaces 52, with respect to the gas flow 19, of the inner and outer bands 38, 40 and outer surfaces 54 of the pressure and suction sides 46, 48 of the airfoils 39.

The hot combustion gas flow 19 flowing over the cooled turbine vanes 32 and outer walls 26 form a flow boundary layer 60 along the inboard surfaces 52 of the inner and outer bands 38, 40 and, as schematically illustrated in FIG. 6, along the outer surfaces 54 of the pressure and suction sides 46, 48 of the outer walls 26. There is a velocity gradient U and a gas temperature gradient T within the flow boundary layer 60 adjacent to the outer surfaces 54 of the pressure and suction sides 46, 48 of the outer walls 26. The velocity gradient U results in shear stresses in the gas flow 19 which causes unwanted and undesirable aerodynamic drag. The gas temperature gradient T results in undesirable heat transfer from the hot gas flow 19 to the colder outer walls 26.

A plasma boundary layer lifting system 11 illustrated in FIGS. 2-5 is designed to lift the flow boundary layer 60 off of and up and away from the outer surfaces 54 of the outer walls 26. The plasma boundary layer lifting system 11 illustrated herein includes chordwise spaced apart plasma generators 2 on the suction sides 48 of the airfoils 39 because the airfoils experience high heating on the suction side. The chordwise spaced apart plasma generators 2 may also be placed on the pressure sides 46 of the airfoils 39. The plasma generators 2 produce an airfoil outer surface conforming plasma 90 along each of the outer surfaces 54 of the suction sides 48 of the airfoils 39. The plasma boundary layer lifting system 11 lifts the flow boundary layer 60 off of and up and away from the outer surfaces 54 of the outer walls 26 of the airfoils 39 as illustrated in FIG. 6. This forms a slip boundary layer 70 for the gas flow 19 to flow over.

The slip boundary layer 70 provides an interface 68 between the gas flow 19 and the outer surface 54 of the outer wall 26 and the interface 68 is not a solid surface when the plasma generators 2 are turned on or energized. The flow boundary layer 60 and its velocity and gas temperature gradients U, T are separated from the outer surface 54 by the slip layer 70 when the plasma generators 2 are energized as illustrated in FIG. 5 whereas the gradients directly contact the outer surface 54 when the plasma generators 2 are not energized as illustrated in FIG. 6.

Lifting of the flow boundary layer 60 off of and up and away from the outer surfaces 54 reduces the surface drag and heat transfer between the gas flow 19 and the outer surfaces 54 of the outer walls 26 of the airfoils 39 due to the flow boundary layer 60. Reduction in surface drag improves the aerodynamic efficiency of the vanes and efficiency of the engine 10. Reduction of heat transfer improves component life of the vane and lowers cooling flow requirement for the vane and, thus, improves engine efficiency.

An exemplary embodiment of the plasma generator 2 illustrated herein includes the plasma generators 2 mounted on the outer walls 26 of the vanes 32. Each of the plasma generators 2 includes inner and outer electrodes 3, 4 separated by a dielectric material 5. The dielectric material 5 is disposed within spanwise extending grooves 6 in the outer surfaces 54 of the outer walls 26 of the vanes 32. An AC power supply 100 is connected to the electrodes to supply a high voltage AC potential to the electrodes.

When the AC amplitude is large enough, the gas flow 19 ionizes in a region of largest electric potential forming the plasma 90. The plurality of plasma generators 2 produce an outer surface conforming plasma 90 which covers a substantial portion of the outer surface 54 of the vane 32. The plasma 90 generally begins at an edge 102 of the inner electrode 3 which is exposed to the gas flow 19 and spreads out over an area 104 projected by the outer electrode 4 which is covered by the dielectric material 5. The plasma 90 in the presence of an electric field gradient produces a force on the gas flow 19 located between the outer surface 54 and the plasma 90 inducing a virtual aerodynamic shape that causes a change in the pressure distribution over the outer surface 54 of the outer wall 26 of the airfoil 39.

The induced virtual aerodynamic shape and resulting change in the pressure distribution forms the slip boundary layer 70 for the gas flow 19 to flow over. It is known that airfoils using plasma generators have been shown to prevent flow separation over the airfoils.

When the plasma generators 2 are turned on the velocity gradient U at the interface 68 is smaller than when the plasma generators 2 are off. Similarly, the temperature gradient T at the interface 68 is also smaller when the plasma generators 2 are on than when the plasma generators 2 are off. Therefore, heating from the hot gas flow 19 to the outer surfaces 54 of the suction sides 48 of the outer walls 26 of the airfoils 39 will also be smaller when the plasma generators 2 are on than when the plasma generators 2 are off. The plasma generators 2 may be operated in either steady state or unsteady modes.

The plasma boundary layer lifting system 11 is illustrated herein for airfoils 39 of a turbine nozzle 30 of a high pressure turbine 22 and more particularly on the suction side 48 of the airfoil's outer wall. The plasma boundary layer lifting system 11 may also be used along the pressure side 46 of the airfoil and along the inboard surfaces 52 of the inner and outer bands 38, 40. The plasma boundary layer lifting system 11 may also be used on turbine vane airfoils in other stages of a high pressure turbine and in a low pressure turbine. The plasma boundary layer lifting system 11 may also be used for a vane assembly in the high pressure and low pressure compressors. A compressor vane assembly includes compressor vane airfoils extending radially between compressor inner and outer bands and the compressor vane airfoils are usually solid instead of hollow.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A plasma boundary layer lifting system comprising:
   at least one gas turbine engine vane having a spanwise extending airfoil,
   the airfoil having suction and pressure sides extending in a chordwise direction between opposite leading and trailing edges, and
   chordwise spaced apart and spanwise extending plasma generators for producing a plasma extending in the chordwise direction along an outer surface of one of the suction and pressure sides.

2. A system as claimed in claim 1 further comprising the plasma generators being mounted on the airfoil.

3. A system as claimed in claim 2 further comprising each of the plasma generators including inner and outer electrodes separated by a dielectric material.

4. A system as claimed in claim 3 further comprising an AC power supply connected to the electrodes to supply a high voltage AC potential to the electrodes.

5. A system as claimed in claim 4 further comprising the dielectric material being disposed within a spanwise extending groove in an outer surface of the airfoil.

6. A system as claimed in claim 3 further comprising the dielectric material being disposed within a spanwise extending groove in an outer surface of the airfoil.

7. A system as claimed in claim 1 further comprising the airfoil being hollow and having an outer wall and the plasma generators being mounted on the outer wall.

8. A system as claimed in claim 7 further comprising each of the plasma generators including inner and outer electrodes separated by a dielectric material.

9. A system as claimed in claim 8 further comprising the dielectric material being disposed within a spanwise extending groove in an outer surface of the outer wall.

10. A system as claimed in claim 9 further comprising an AC power supply connected to the electrodes to supply a high voltage AC potential to the electrodes.

11. A system as claimed in claim 7 further comprising the airfoil being a high pressure turbine nozzle vane.

12. A system as claimed in claim 11 further comprising each of the plasma generators including inner and outer electrodes separated by a dielectric material disposed within a spanwise extending groove in an outer surface of the outer wall.

13. A system as claimed in claim 12 further comprising an AC power supply connected to the electrodes to supply a high voltage AC potential to the electrodes.

14. A system as claimed in claim 2 further comprising the airfoil being a solid compressor airfoil and each of the plasma generators including inner and outer electrodes separated by a dielectric material.

15. A system as claimed in claim 14 further comprising the dielectric material being disposed within a spanwise extending groove in an outer surface of the airfoil.

16. A plasma boundary layer lifting system comprising:
    a vane assembly including a row of circumferentially spaced apart and radially extending gas turbine engine vanes,
    each of the vanes having a spanwise extending airfoil,
    the airfoil having suction and pressure sides extending in a chordwise direction between opposite leading and trailing edges, and
    chordwise spaced apart and spanwise extending plasma generators for producing a plasma extending in the chordwise direction along an outer surface of one of the suction and pressure sides.

17. A system as claimed in claim 16 further comprising the plasma generators being mounted on the airfoil.

18. A system as claimed in claim 17 further comprising each of the plasma generators including inner and outer electrodes separated by a dielectric material.

19. A system as claimed in claim 18 further comprising the dielectric material being disposed within a spanwise extending groove in an outer surface of the airfoil.

20. A system as claimed in claim 19 further comprising an AC power supply connected to the electrodes to supply a high voltage AC potential to the electrodes.

21. A system as claimed in claim 19 further comprising the row of circumferentially spaced apart and radially extending gas turbine engine vanes having circumferential segments with two or more vanes per segment.

22. A method for operating a gas turbine engine having a plasma boundary layer lifting system comprising:
    a vane assembly including a row of circumferentially spaced apart and radially extending gas turbine engine vanes,
    each of the vanes having a spanwise extending airfoil,
    the airfoil having suction and pressure sides extending in a chordwise direction between opposite leading and trailing edges, and
    chordwise spaced apart and spanwise extending plasma generators for producing a plasma extending in the chordwise direction along the outer surface of one of the suction and pressure sides,
    the method comprising forming a plasma extending in the chordwise direction along the outer surface of the one of the pressure and suction sides.

23. A method as claimed in claim 22 wherein the forming the plasma further includes energizing chordwise spaced apart and spanwise extending plasma generators.

24. A method as claimed in claim 23 wherein the forming the plasma further includes supplying an AC potential to inner and outer electrodes separated by a dielectric material in each of the plasma generators.

25. A method as claimed in claim 24 further comprising the dielectric material being disposed within a spanwise extending groove in an outer surface of the outer wall.

26. A method as claimed in claim 25 further comprising operating the plasma generators in steady state or unsteady modes.

* * * * *